US012476327B2

(12) United States Patent
Barnard

(10) Patent No.: US 12,476,327 B2
(45) Date of Patent: Nov. 18, 2025

(54) BATTERY ASSEMBLY FOR AEROSPACE VEHICLES

(71) Applicant: Matthew Barnard, St. Louis, MO (US)

(72) Inventor: Matthew Barnard, St. Louis, MO (US)

(*) Notice: Subject to any disclaimer, the term of this patent is extended or adjusted under 35 U.S.C. 154(b) by 675 days.

(21) Appl. No.: 17/816,141

(22) Filed: Jul. 29, 2022

(65) Prior Publication Data

US 2024/0039124 A1    Feb. 1, 2024

(51) Int. Cl.
| | |
|---|---|
| *H01M 50/503* | (2021.01) |
| *B60L 50/60* | (2019.01) |
| *B64C 19/00* | (2006.01) |
| *B64C 39/02* | (2023.01) |
| *B64D 27/357* | (2024.01) |

(Continued)

(52) U.S. Cl.
CPC .......... *H01M 50/503* (2021.01); *B60L 50/66* (2019.02); *B64C 19/00* (2013.01); *B64D 27/357* (2024.01); *H01M 10/613* (2015.04); *H01M 10/625* (2015.04); *H01M 10/6563* (2015.04); *H01M 50/213* (2021.01); *H01M 50/249* (2021.01); *H01M 50/264* (2021.01); *H01M 50/296* (2021.01); *H01M 50/298* (2021.01); *H01M 50/516* (2021.01); *H01M 50/522* (2021.01); *B60L 2200/10* (2013.01); *B64C 39/024* (2013.01); *H01M 2220/20* (2013.01)

(58) Field of Classification Search
CPC ............ H01M 50/503; H01M 10/613; H01M 10/625; H01M 10/6563; H01M 50/213; H01M 50/249; H01M 50/264; H01M 50/296; H01M 50/298; H01M 50/516; H01M 50/522; H01M 2220/20; B60L 50/66; B60L 2200/10; B60L 50/64; B64C 19/00; B64C 39/024; B64D 27/24; B64D 27/357
USPC ........................................................ 320/107
See application file for complete search history.

(56) References Cited

U.S. PATENT DOCUMENTS 7,304,453 B2 * 12/2007 Eaves ................. H01M 10/425
320/120
8,967,529 B1 *  3/2015 Bennett ................... B60L 50/64
446/57

(Continued)

FOREIGN PATENT DOCUMENTS

| CN | 107107768 A | * | 8/2017 | ................ B60L 3/12 |
| CN | 110994069 B | * | 7/2021 | ............ H01M 10/42 |

(Continued)

*Primary Examiner* — M Baye Diao
(74) *Attorney, Agent, or Firm* — Scale LLP

(57) ABSTRACT

Disclosed are methods and systems for aerospace vehicle batteries. For instance, a battery assembly may include a first and second battery assembly terminals; a plurality of battery cells, the plurality of battery cells being arranged in groups, each group of battery cells having a stacked arrangement of n by m battery cells orientated in a same direction, n being at least two and m being at least two; a first subset of the groups form a first linear arrangement arranged end-to-end in a first direction; and a second subset of the groups form a second linear arrangement arranged end-to-end in a second direction; a plurality of group connectors, each being configured to connect two respective battery cell groups; and a linear arrangement connector configured to connect the first linear arrangement to the second linear arrangement.

20 Claims, 15 Drawing Sheets

(51) Int. Cl.
*H01M 10/613*     (2014.01)
*H01M 10/625*     (2014.01)
*H01M 10/6563*    (2014.01)
*H01M 50/213*     (2021.01)
*H01M 50/249*     (2021.01)
*H01M 50/264*     (2021.01)
*H01M 50/296*     (2021.01)
*H01M 50/298*     (2021.01)
*H01M 50/516*     (2021.01)
*H01M 50/522*     (2021.01)

(56) References Cited

U.S. PATENT DOCUMENTS

| | | | | |
|---|---|---|---|---|
| 9,876,212 B2* | 1/2018 | Wintner | ............... | H01M 10/613 |
| 11,355,819 B2* | 6/2022 | Fees | .................... | H01M 10/625 |
| 2016/0172642 A1* | 6/2016 | Hughes | ............... | H01M 50/227 |
| | | | | 429/130 |
| 2018/0131032 A1* | 5/2018 | Ishii | ................. | H01M 10/0481 |
| 2020/0083515 A1* | 3/2020 | Lejosne | .............. | H01M 50/262 |

FOREIGN PATENT DOCUMENTS

| | | | | | |
|---|---|---|---|---|---|
| CN | 114730934 | A | * | 7/2022 | .......... H01M 10/613 |
| EP | 1026759 | A1 | * | 8/2000 | .......... H01M 10/441 |
| EP | 4195353 | A1 | * | 6/2023 | ............. B60L 50/66 |
| GB | 2590461 | A | * | 6/2021 | ............ H01M 50/20 |
| JP | 2020080311 | A | * | 5/2020 | ........ H01M 10/0422 |

* cited by examiner (6) continue folding group connectors of first linear arrangement until groups are arranged end-to-end (9) continue folding group connectors of second linear arrangement until groups are arranged end-to-end

(10) (optional) bind second linear arrangement to at least one binding element

(11) (optional) connect sensing wires to sensing connectors

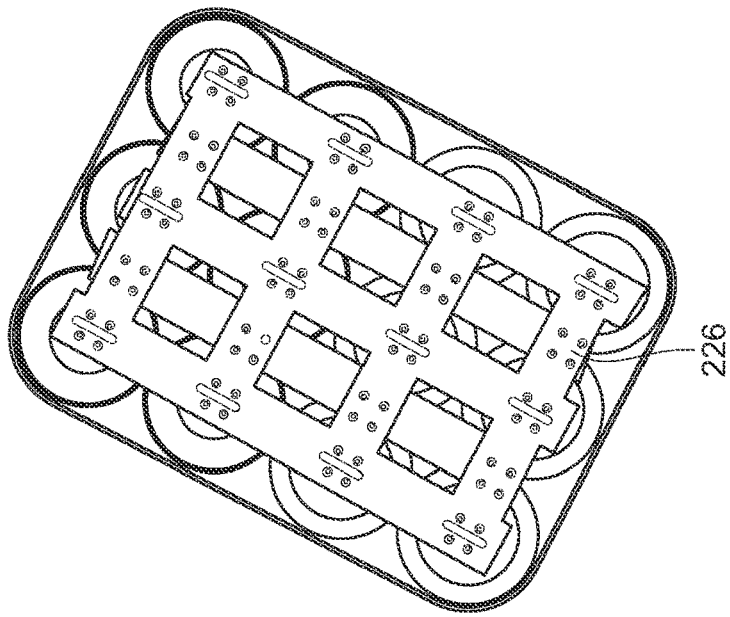
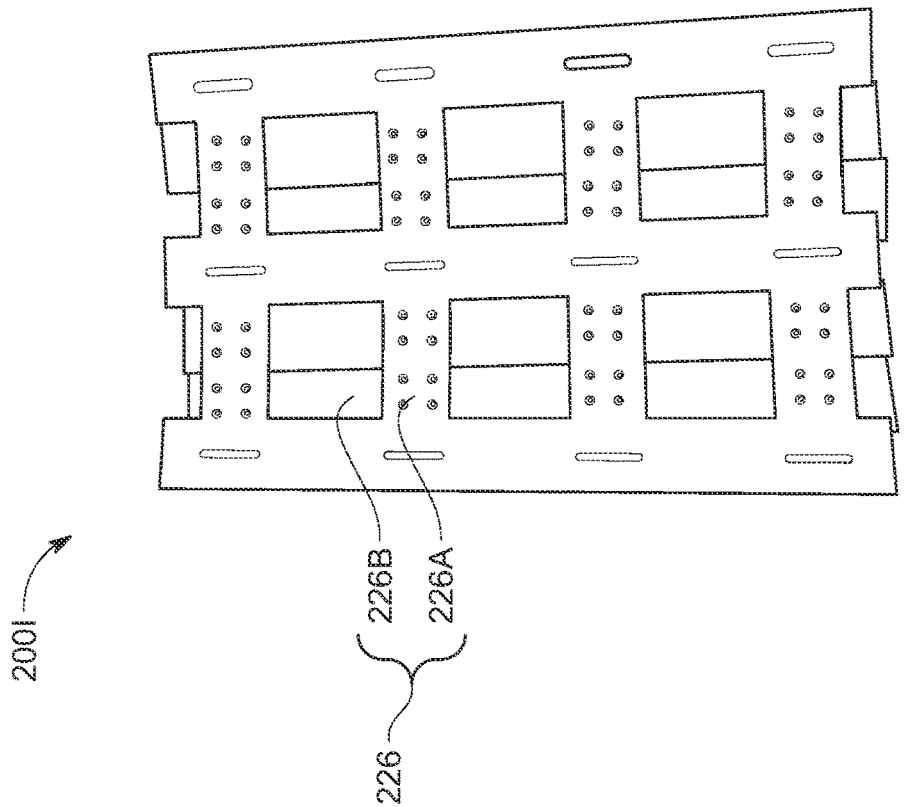
FIG. 21

BATTERY ASSEMBLY FOR AEROSPACE VEHICLES

TECHNICAL FIELD

Various aspects of the present disclosure relate generally to a battery assembly for aerospace vehicles and, more particularly, to a battery assembly for unmanned air vehicles.

BACKGROUND

Generally, battery assemblies for aerospace vehicles (e.g., drones, satellites, manned aircraft, urban air mobility, and the like) should be powerful while being light weight. Moreover, as power demands grow, weight and conductive resistance (due to additional conductive wiring) also increase, and efficiencies for weight or power delivery are more desirable.

The present disclosure is directed to overcoming one or more of these above-referenced challenges.

SUMMARY OF THE DISCLOSURE

According to certain aspects of the disclosure, systems and methods are disclosed for a battery assembly for aerospace vehicles.

For instance, a battery assembly may include: a first battery assembly terminal; a second battery assembly terminal; a plurality of battery cells, wherein the plurality of battery cells are arranged in groups, wherein each group of battery cells has a stacked arrangement of n by m battery cells orientated in a same direction, wherein n is at least two and m is at least two; a first subset of the groups of battery cells form a first linear arrangement connected to the first battery assembly terminal and the first subset are arranged end-to-end in a first direction; and a second subset of the groups of battery cells form a second linear arrangement connected to the second battery assembly terminal and the second subset are arranged end-to-end in a second direction; a plurality of group connectors, each group connector being configured to connect two respective battery cell groups within each of the first linear arrangement or the second linear arrangement, wherein each group connector connects cathodes of a first battery cell group to anodes of a second battery cell group; and a linear arrangement connector configured to connect the first linear arrangement to the second linear arrangement.

Moreover, an aerospace vehicle may include: a battery assembly; a housing configured to receive the battery assembly; avionics and actuation systems positioned on the housing and configured to control speed, altitude, orientation, and/or attitude of the aerospace vehicle via power from the battery assembly; and a control system to control the avionics and actuation systems. The battery assembly may include: a first battery assembly terminal; a second battery assembly terminal; a plurality of battery cells, wherein the plurality of battery cells are arranged in groups, wherein each group of battery cells has a stacked arrangement of n by m battery cells orientated in a same direction, wherein n is at least two and m is at least two; a first subset of the groups of battery cells form a first linear arrangement connected to the first battery assembly terminal and the first subset are arranged end-to-end in a first direction; and a second subset of the groups of battery cells form a second linear arrangement connected to the second battery assembly terminal and the second subset are arranged end-to-end in a second direction; a plurality of group connectors, each group connector being configured to connect two respective battery cell groups within each of the first linear arrangement or the second linear arrangement, wherein each group connector connects cathodes of a first battery cell group to anodes of a second battery cell group; and a linear arrangement connector configured to connect the first linear arrangement to the second linear arrangement.

Furthermore, a method of manufacturing a battery assembly may include: arrange groups of battery cells; connect group connectors to respective groups of battery cells; connect linear arrangement connector to groups that form ends of linear arrangements; connect terminal connectors to terminal groups; fold the group connectors along fold lines between respective groups to form each linear arrangement, thereby forming a pre-packaged battery assembly; connect terminal wires to terminal connectors; and package the pre-packaged battery assembly, thereby forming the battery assembly.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

FIGS. 2A-2J depict features of, and operations in manufacturing of, a battery assembly, in accordance with aspects of the present disclosure.

DETAILED DESCRIPTION

In general, the present disclosure is directed to methods and systems for battery assemblies for aerospace vehicles. As discussed in detail herein, a battery assembly may include at least a plurality of battery cells, arranged in groups. In some cases, each group of battery cells has a stacked arrangement of n by m battery cells orientated in a same direction, where n is at least 2 and m is at least 2. The groups of battery cells may be arranged end-to-end and connected by at least one group connector. For instance, if there are N groups, there may be N−1 group connectors. The group connector may be a metal grid welded to electrodes of two different groups and folded over during assembly, so that the groups are end-to-end. In this manner, the battery assembly may increase battery cell density and efficiently transfer electrical power, as discussed herein. In some cases, battery groups arranged "end-to-end" may mean that electrodes of a battery group face electrodes of another battery group, and the battery cells of the two groups may be axially arranged in a same direction. For instance, respective battery cells of each group may be aligned on a same axis. For instance, cathodes of one group may face cathodes of another group, or cathodes of one group may face anodes of another group.

In some cases, the battery assembly includes two or more linear elements, each linear element having subsets of the groups of battery cells and being connected by linear element connectors. In this manner, the battery assembly may support arbitrary large capacity for aerospace vehicles and efficiently transfer electrical power, as discussed herein.

Thus, methods and systems of the present disclosure may be improvements to battery assemblies, especially for aerospace vehicles.

Environment

Figure 1:
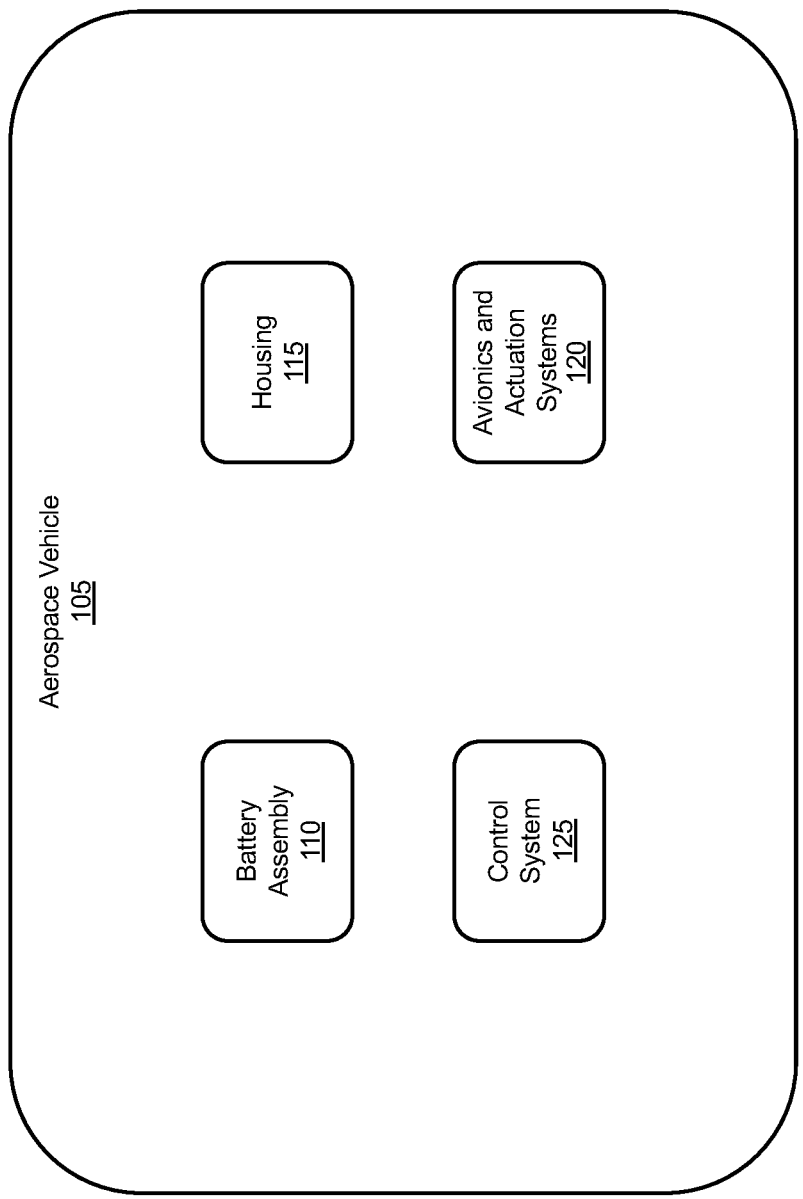
FIG. 1 depicts an example environment of an aerospace vehicle with a batter assembly, in accordance with aspects of the present disclosure.

FIG. 1 depicts an example environment 100 of an aerospace vehicle 105 with a battery assembly 110, in accordance with features of the present disclosure. The aerospace vehicle 105 may be an unmanned aerial vehicle (e.g., a drone or UAV), a manned aircraft (e.g., commercial or general aviation), or a space vehicle (e.g., satellites, spaceships, or surface vehicles designed for space travel). The aerospace vehicle 105 may include a battery assembly 110, as discussed herein, a housing 115, avionics and actuation systems 120, and a control system 125.

The housing 115 may be configured to receive the battery assembly 110. The housing 115 may be formed of any suitable material, including metals (e.g., aluminum, and the like), plastics, polycarbonate, acrylic, carbon fiber, ABS, PVC, Teflon, and/or general polymers.

The avionics and actuation systems 120 may be positioned on/in the housing 115. The avionics and actuation systems 120 may be configured to control speed, altitude, orientation, and/or attitude of the aerospace vehicle 105. The avionics and actuation systems 120 draw power from the battery assembly 110. For instance, avionics may obtain sensor data (e.g., GPS data and the like) and/or flight data (e.g., battery current draw, motor speeds, and the like) for use by the control system 125. The actuation systems may be rockets (e.g., chemical or electric propulsion rockets), propellers, control surfaces, and the like.

The control system 125 may be positioned on/in the housing 115. The control system 125 may be configured to control the avionics and actuation systems 120, in accordance with various control laws, user inputs (e.g., on a remote controller), and state information (e.g., location, speed, orientation, altitude, attitude of the aerospace vehicle 105 over time).

Battery Assembly

The battery assembly 110 may include at least a plurality of battery cells 206, arranged in groups 204A-1 through 204A-3 and 204B-1 through 204B-3. In some cases, each group of battery cells has a stacked arrangement of n by m battery cells orientated in a same direction, where n is at least 2 and m is at least 2. In some cases, the n by m battery cells may have a 2×3 arrangement. In some cases, the n by m battery cells may have a 2×4 arrangement, and the like.

In some cases, the battery assembly 110 may have a first battery assembly terminal 212/232 and a second battery assembly terminal 212/232. The battery assembly terminal 212/232 may have a terminal connector 212 connected to a multi-thread wire 232. In some cases, the terminal connector 212 may be a metal grid. In some cases, the terminal connector 212 may be welded or soldered to electrodes of battery cells terminals. For instance, the terminal connector 212 may be welded to the electrodes to increase structural rigidity and provide an electrical surface to attach the multi-thread wire 232.

In some cases, the multi-thread wire 232 may be connected to the terminal connector 212 by soldering or welding. In some cases, the multi-thread wire 232 may be split into at least two subthreads 236 and 238 (connected to terminal line 234). The at least two subthreads 236 and 238 maybe connected to separate regions of the terminal connector 212. For instance, connecting the multi-thread wire 232 to separate regions may provide more efficient transfer of electrical energy via the multi-thread wire 232, rather than via terminal connector 212 (as the multi-thread wire 232 may have less electrical resistance than the terminal connector 212 and connecting to separate regions shortens the electrical pathway to the terminal line 234). Furthermore, the load on the battery cells may be more evenly distributed, as (in the case of a single wire connection to the terminal connector 212) may cause battery cells further away from the connection (than battery cells closer to the connection) to conduct (at higher electrical resistance) via the metal grid of the terminal connector 212 and load less than the battery cells closer to the connection. In this manner, load on battery cells may be more evenly distributed, and additional wear on the closer battery cells may be avoided.

In some cases, the at least two subthreads 236 and 238 are a same number as largest of n or m. For instance, if n×m is 2×3, then the largest number is 3 and the subthreads may be split into three subthreads. In this manner, load on battery cells may be more evenly distributed by matching a largest dimension of n×m and a number of subthreads.

In some cases, the battery assembly 110 may have a first subset of the groups of battery cells that form a first linear arrangement 220A. The first linear arrangement 220A may be connected to the first battery assembly terminal 212/232. The first subset of groups may be arranged end-to-end in a first direction. In some cases, the battery assembly 110 may have a second subset of the groups of battery cells form a second linear arrangement 220B. The second linear arrangement 220B may be connected to the second battery assembly terminal 212/232. The second subset may be arranged end-to-end in a second direction. In some cases, the first direction is parallel and opposite the second direction.

In some cases, the battery assembly 110 may have a plurality of group connectors 208. Each group connector 208 may be configured to connect two respective battery cell groups within each of the first linear arrangement 220A or the second linear arrangement 220B. For instance, each group connector 208 connects electrodes 206B (e.g., cathodes) of a first battery cell group to electrodes 206B (e.g., anodes) of a second battery cell group.

In some cases, the group connectors 208 are a metal grid, folded over a fold line 210. In some cases, the group connectors 208 are made of nickel. For instance, nickel may be resistive welded to electrodes 206B of battery cells, while copper may not be resistive welded to electrodes 206B of battery cells. However, using laser or ultrasonic welding, other metals may be used. One of skill in the art would recognize that various metal types may be used with various connection methods (e.g., soldering, laser welding, ultrasonic welding, resistive welding). Thus, generally, the group connectors 208 may be formed of conductive metal that is capable of being electrically affixed to electrodes of a battery cell.

In some cases, the group connectors 208 are formed in a grid having grid pattern of [2n by m] or [n by 2m] and folded over an n axis or m axis. In some cases, the grid pattern connects (via edges) each vertex of the grid pattern to each neighboring grid vertex. In some cases, certain edges may be omitted. In some cases, vertices along the n axis or m axis may (which ever the fold occurs over) may include one or more edges connecting vertices. In some cases vertices along the n axis or m axis may (which ever the fold does not occur over) may not connect to other rows/columns. In this manner, the group connectors 208 may provide structural rigidity and multiple electrical pathways to connect respective battery groups.

In some cases, the group connectors 208 are formed in a grid having grid pattern. In some cases, the group connectors 208 may fold over a symmetry line of the grid pattern. In some cases, the group connectors 208 are a mirrored-n-sided polygon grid. For instance, the polygon may be a triangle, a square, a rectangle, a pentagon, a hexagon, and the like). The polygon (of a first half of the metal grid) may not have an axis of symmetry, as a mirrored polygon that forms a second half of the metal grid may provide an axis of symmetry. The polygon may have an axis of symmetry (e.g., in the case of the square or rectangle and the like). The group connectors 208 may be folded along the axis of symmetry such that connected groups are arranged end-to-end.

In some cases, the battery assembly 110 may a linear arrangement connector 226. The linear arrangement connector 226 may be configured to connect the first linear arrangement 220A to the second linear arrangement 220B. The linear arrangement connector 226 may be a metal grid 226A. The linear arrangement connector 226 may be connected to electrodes of different groups of first linear arrangement 220A to the second linear arrangement 220B. The linear arrangement connector 226 may be connected to end groups of the first linear arrangement 220A to the second linear arrangement 220B. The linear arrangement connector 226 may be welded or soldered to the electrodes of the groups. In this manner, the linear arrangement connector 226 may provide structural rigidity and electrical conductivity between the first linear arrangement 220A to the second linear arrangement 220B.

In some cases, the linear arrangement connector 226 may be a metal grid 226A connected to runners 226B. In some cases, the metal grid 226A may be connected to runners 226B by welding or soldering. In some cases, the runners 226B may be on top of the metal grid 226A (e.g., away from electrodes of groups). In some cases, the runners 226B may be in between the metal grid 226A and electrodes of groups. In some cases, the metal grid 226A may be formed of a first metal, and the runners 226B may be formed of a second metal. The first metal may have a higher electrical resistance than an electrical resistance of the second metal. In some cases, the first metal may be nickel and the like. In some cases, the second metal may be copper, and the like. In this manner, the second metal may more efficiently transfer electrical current between battery groups. For instance, (e.g., using resistive welding) copper runners 226B may be welded to nickel metal grids 226A, but could not be welded to electrodes, and the nickel metal grids 226A may be welded to the electrodes.

In some cases, the battery assembly 110 has more than two linear arrangements 220 (e.g., a plurality of linear arrangements, each having sets of groups). In some cases, each linear arrangement 220 has a same or different number of groups. In some cases, each group has a same or different number of battery cells.

In some cases, the battery assembly 110 may include a first binding element to bind the first linear arrangement 220A and the second linear arrangement 220B. For instance, the first binding element may be glue, a mechanical clamp, a wrap (e.g., tape, paper, foam, plastic, Kevlar, and the like), carbon fiber box, and the like. In some cases, the battery assembly 110 may include a second binding element to bind battery cells of a group together, such as glue, a mechanical clamp, a wrap (e.g., tape, paper, foam, plastic, Kevlar, and the like), and the like. For instance, the binding elements may any one or combinations of: composite box (e.g., in which battery groups or the linear arrangements sit in), vacuum form composite material around the battery groups/linear arrangements 220, adhesive paper/shrink wrap combination, box made of metal and/or plastic, and/or plastic injection molded parts.

In some cases, the battery assembly 110 may include a fan positioned at one end of the battery assembly 110 and configured to circulate air through the battery assembly. 110. In some cases, the battery assembly 110 may include a fan for each linear arrangement 220, each fan being configured to circulate air through each linear arrangement.

Features and Manufacture of Battery Assembly

FIGS. 2A-2J depict features of, and operations in manufacturing, a battery assembly in diagrams 200A, 200B, 200C, 200D, 200E, 200F, 200G, 200H, 200I, and 200J, in accordance with features of the present disclosure. The features, and the method of manufacturing, the battery assembly 110 applies to the battery assembly 110 as described above with respect to FIG. 1. In particular, operations to manufacture a battery assembly 110 are depicted to clarify arrangement and construction of the battery assembly 110.

Figure 2A:
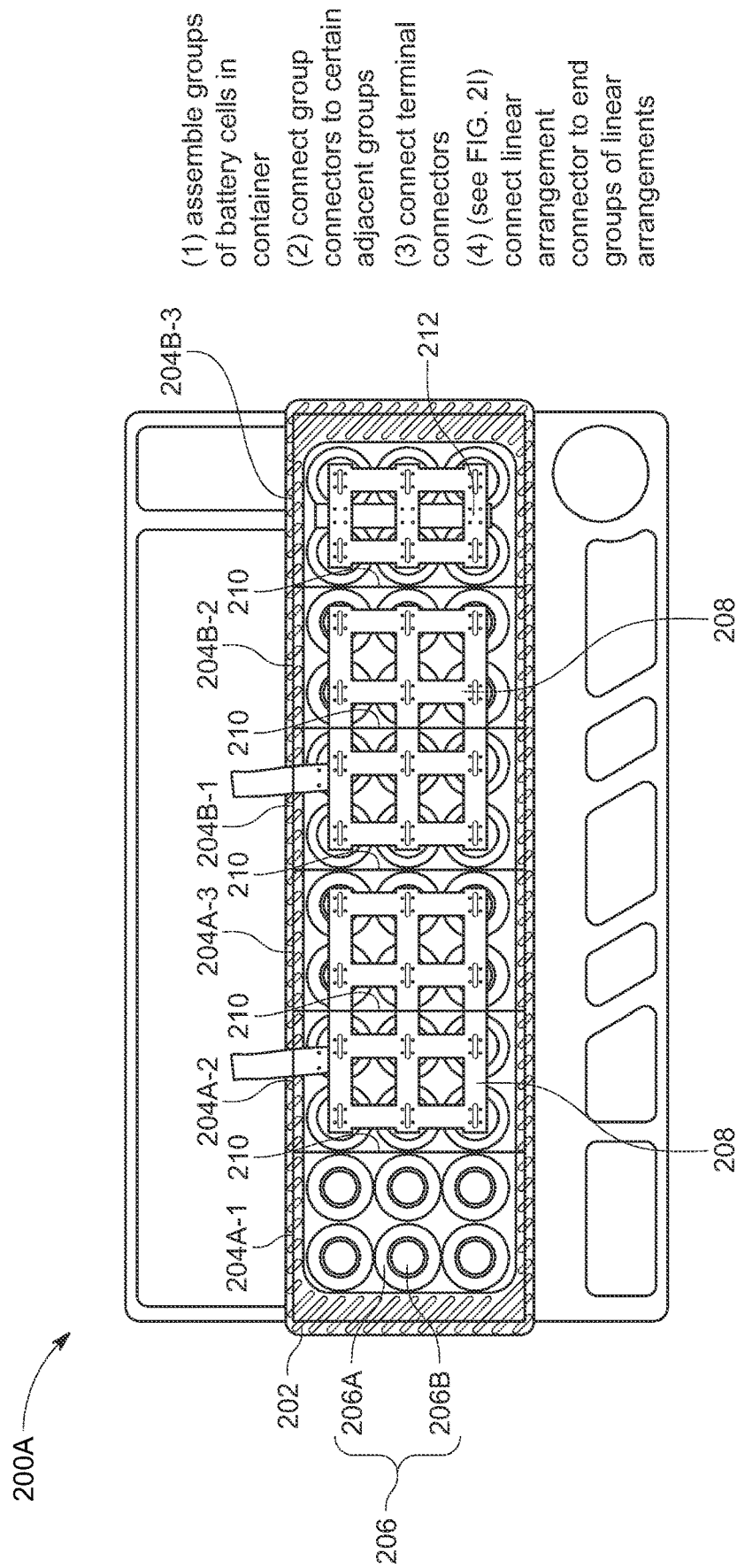

In FIG. 2A, operation (1) may include assembling groups (e.g., first group 204A-1, second group 204A-2, third group 204A-3, fourth group 204B-1, fifth group 204B-2, and sixth group 204B-3) of battery cells 206 (having cell 206A and electrodes 206B) in container 202. For instance, the first group 204A-1 may be assembled as a stack with first electrodes orientated upward; the second group 204A-2 may be assembled as a stack with second electrodes orientated upward; the third group 204A-3 may be assembled as a stack with first electrodes orientated upward; the fourth group 204B-1 may be assembled as a stack with second electrodes orientated upward; the fifth group 204B-2 may be assembled as a stack with first electrodes orientated upward; and the sixth group 204B-3 may be assembled as a stack with second electrodes orientated upward. The first electrodes may be a first one anodes or cathodes of battery cells, and the second electrodes may be a second one of anodes or cathodes of battery cells.

Operation (2) may include connecting group connectors 208 (with fold line 210) to certain adjacent groups. For instance, on the opposite (not depicted) a group connector 208 may be connected between the first group 204A-1 and second group 204A-2; a group connector 208 may be connected between the second group 204A-2 and the third group 204A-3; a group connector 208 may be connected between the fourth group 204B-1 and the fifth group 204B-2; and on the opposite (not depicted) a group connector 208 may be connected between the fifth group 204B-2 and the sixth group 204B-3.

Operation (3) may include connecting terminal connectors 212 to terminal groups. For instance, a terminal connector 212 may be connected to the sixth group 204B-3; and a terminal connector 212 may be connected to the first group 204A-1 (see FIG. 2H).

Operation (4) may include connecting a linear arrangement connector 226 (see FIG. 2I) to end groups of linear arrangements. For instance, a linear arrangement connector 226 may be connected to the third group 204A-3 and the fourth group 204B-1.

Figure 2B:
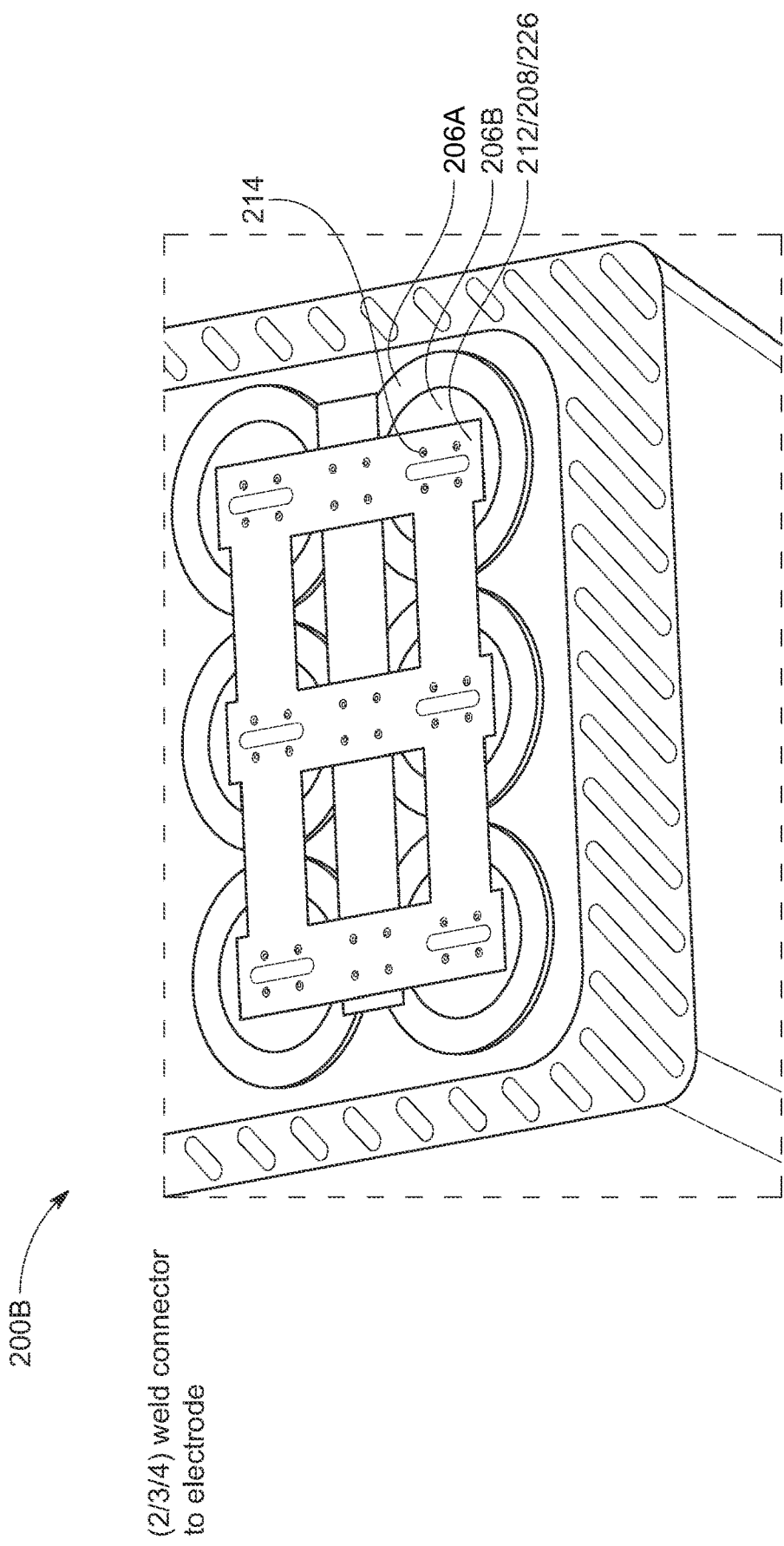

FIG. 2B may depict a method of connecting connectors 212/208/226 to electrodes in operations (2), (3), or (4). In particular, operations (2), (3), or (4) may include welding a connector (e.g., 212/208/226) to electrodes of battery cells. For instance, weld contact 214 may indicate where a resistive welding point contacted a connector to weld a connector to an electrode of a battery cell.

Figure 2C:
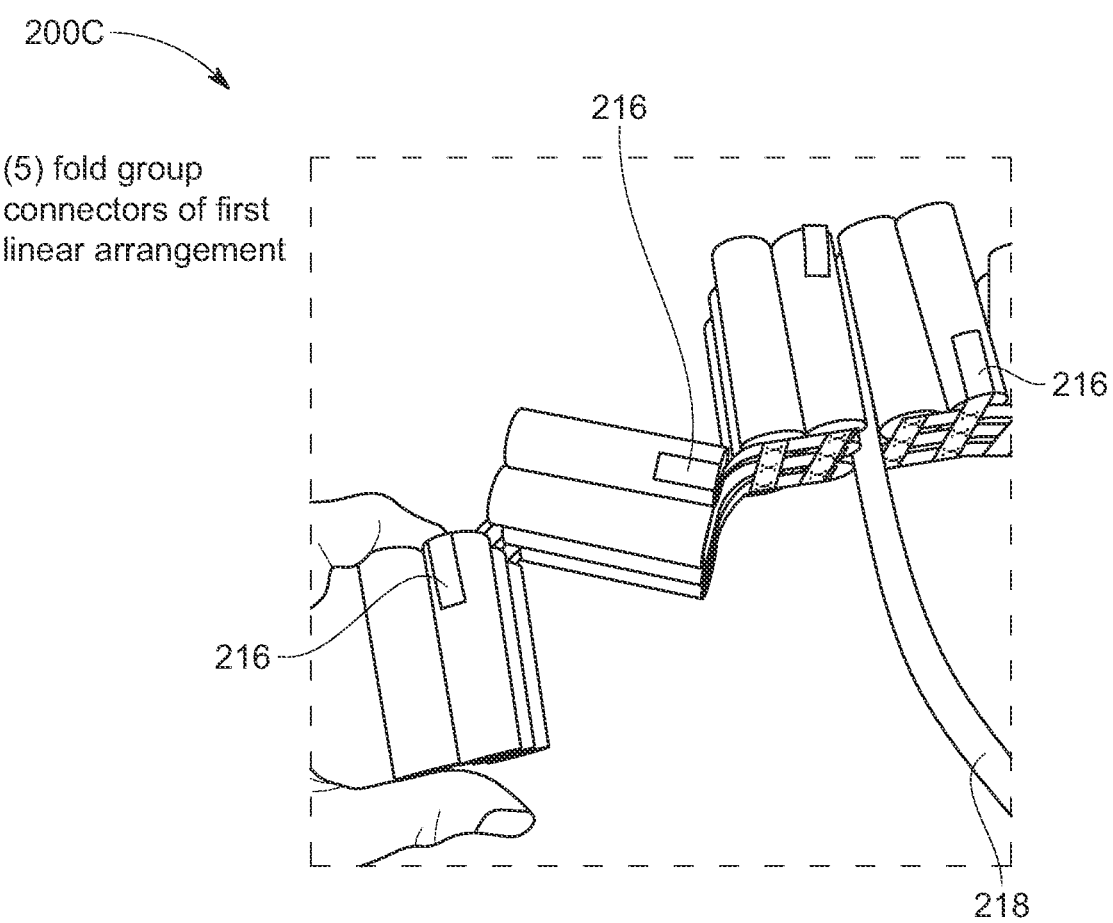

In FIG. 2C, operation (5) may include folding group connectors 208 of first linear arrangement (including first group 204A-1, second group 204A-2, and third group 204A-3). For instance, folding group connectors 208 may be done along fold line 210 of the group connectors 208. FIG. 2C may also depict sensing connectors 216 connected between certain groups. The sensing connectors 216 may be connected on top of group connectors 208 or in between group connectors 208 and the electrodes 206B of battery cells 206, by welding or solder (if electrically connected) or by glue (if using a hall effect sensor, discussed herein).

Figure 2D:
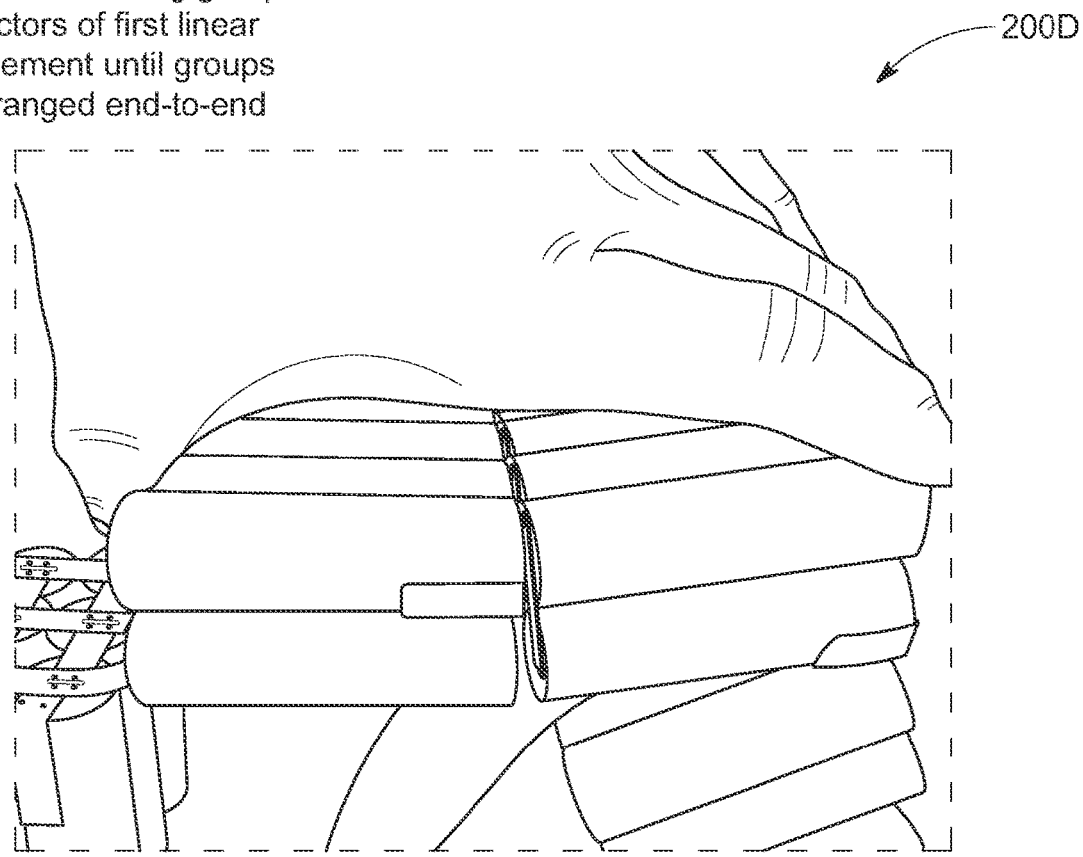

In FIG. 2D, operation (6) may include continue folding group connectors 208 of first linear arrangement 220A until groups (including first group 204A-1, second group 204A-2, and third group 204A-3) are arranged end-to-end. For instance, the group connectors 208 may be folded approximately 180° and contact respective portions of the folded group connectors 208, thus generating additional pathways for electrons to flow between battery groups. In some cases, the end-to-end groups may be separated by 0 (within manufacturing tolerances) to 5 mm (or more), with electrons passing from electrodes of a first group to a first portion of a group connector 208 (e.g., connected to the first group), from the first portion to a second portion of a group connector 208 (e.g., connected to a second group) via the group connector 208 and/or via the additional pathways, and then from the second portion to electrodes of the second group. In this manner, an effective electrical resistance from one group to a next group may be reduced, and the battery assembly 110 may be more efficient (as compared to longer electrical pathways). Moreover, all battery cells may have similar length electrical pathways between groups (as the group connector 208 is symmetrical), thus differentials of discharge of battery cells within a group may be avoided.

Figure 2E:
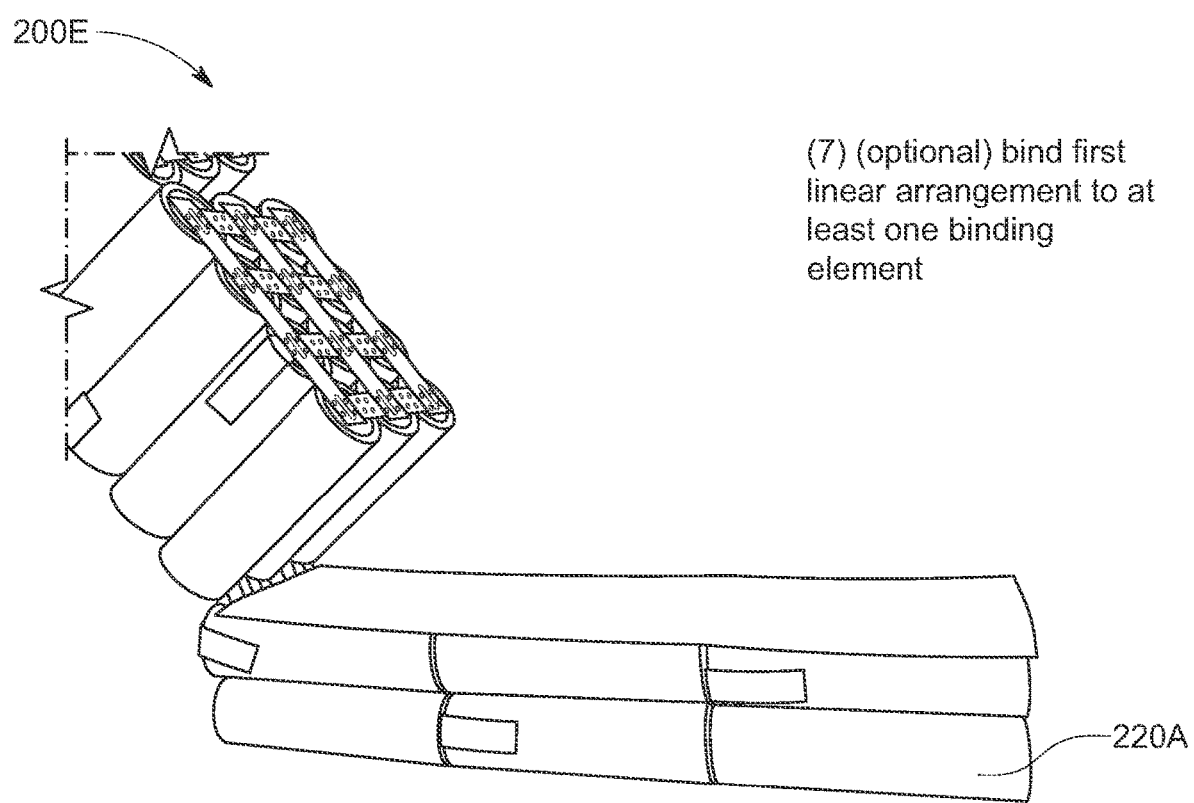

In FIG. 2E, operation (7) may be optional (e.g., to reduce weight, and rely on a separate binding element for the battery assembly 110 in its entirety for mechanical integrity). Operation (7) may include binding the first linear arrangement 220A to at least one binding element, such as binding element 218. For instance, the binding element 218 may be a double-sided adhesive tape/paper. The first linear arrangement 220A may be connected to the binding element 218 by the adhesive of the binding element 218. The tape/paper extend from one end of the first linear arrangement 220A to another end of the first linear arrangement 220A (e.g., in a same orientation of the cells) and extend to lateral sides of the first linear arrangement 220A (e.g., be as wide as the stacks of the groups). For instance, the tape/paper may be non-conductive to prevent shorts between groups of the first linear arrangement 220A and groups of the second linear arrangement 220B (as the second linear arrangement 220B may adhered to the other side). In some cases, the first linear arrangement 220A may be bound using sheathing (e.g., plastic, foam, paper, Kevlar, and the like), glue (e.g., between and across cells), tape (e.g., around and across groups), or mechanical means (e.g., brackets).

Figure 2F:
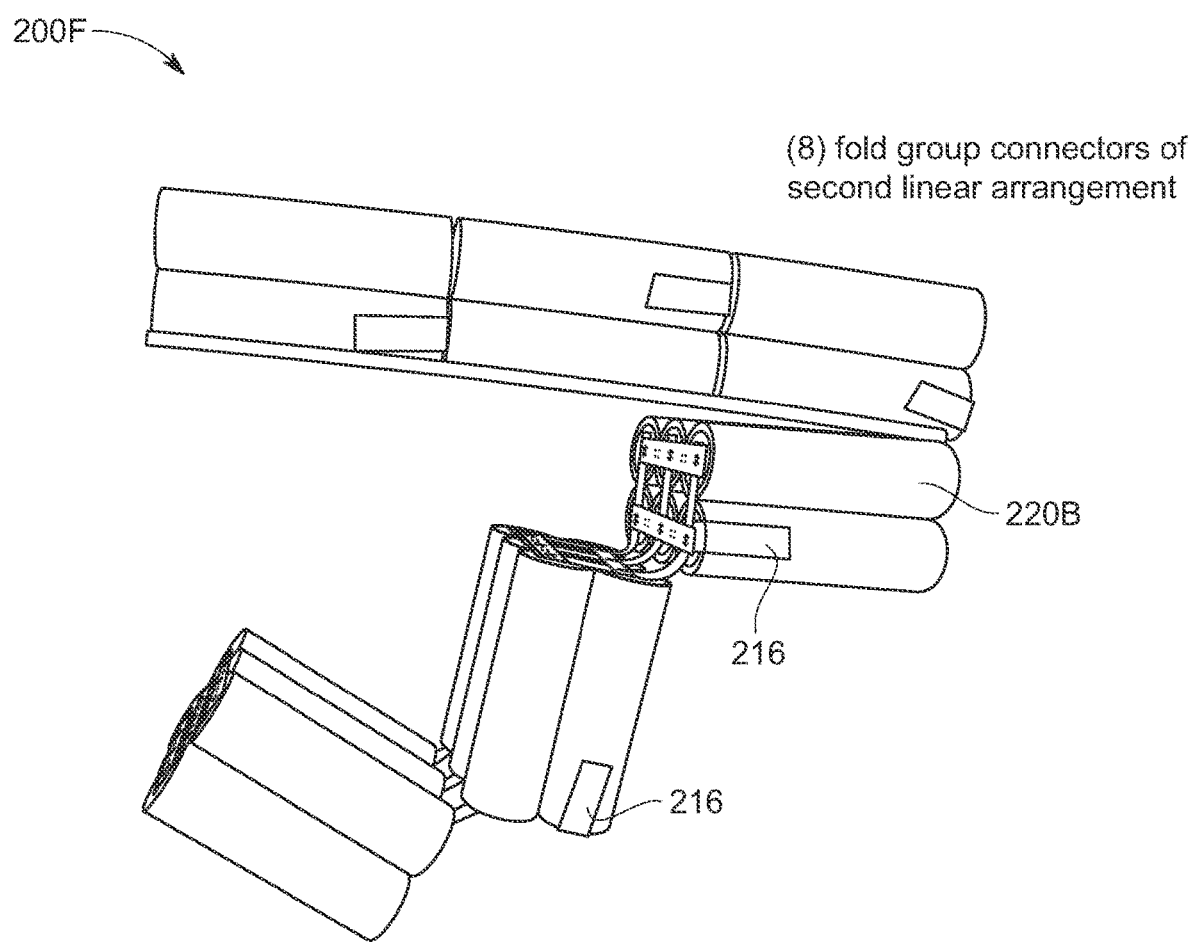

In FIG. 2F, operation (8) may include folding group connectors 208 of second linear arrangement 220B (including fourth group 204B-1, fifth group 204B-2, and sixth group 204A-3). For instance, folding group connectors 208 may be done along fold lines 210 of the group connectors 208. FIG. 2C may also depict sensing connectors 216 connected between certain groups. The sensing connectors 216 may be connected on top of group connectors 208 or in between group connectors 208 and the electrodes 206B of battery cells 206.

Figure 2G:
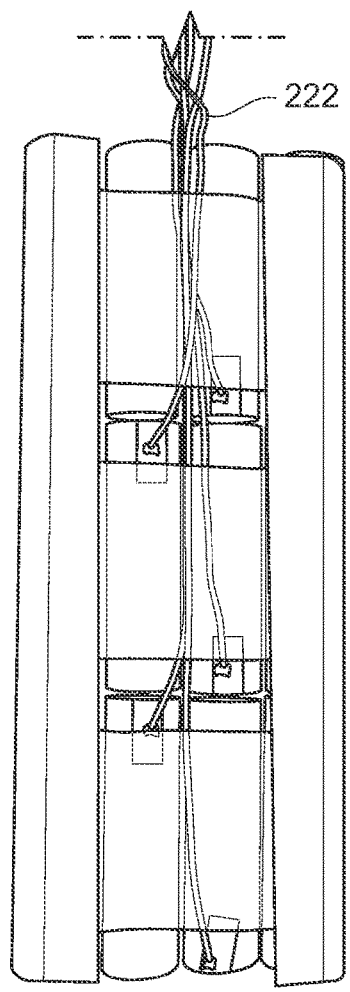

In FIG. 2G, operation (9) may include continue folding group connectors 208 of second linear arrangement 220B until groups (including fourth group 204B-1, fifth group 204B-2, and sixth group 204A-3) are arranged end-to-end. For instance, the group connectors 208 may be folded approximately 180° and contact respective portions of the folded group connectors 208, thus generating additional pathways for electrons to flow between battery groups. In some cases, the end-to-end groups may be separated by 0 to 5 mm (or more), with electrons passing from electrodes of a first group to a first portion of a group connector 208 (e.g., connected to the first group), from the first portion to a second portion of a group connector 208 (e.g., connected to a second group) via the group connector 208 and/or via the additional pathways, and then from the second portion to electrodes of the second group. In this manner, an effective electrical resistance from one group to a next group may be reduced, and the battery assembly 110 may be more efficient (as compared to battery assemblies with longer electrical pathways connecting groups). Moreover, all battery cells may have similar length electrical pathways between groups (as the group connector 208 is symmetrical), thus differentials of discharge of battery cells within a group may be avoided.

Operation (10) may be optional (e.g., to reduce weight, and rely on a separate binding element for the battery assembly 110 in its entirety for mechanical integrity). Operation (10) may include binding the second linear arrangement 220B to at least one binding element, such as binding element 218. As discussed above, the binding element 218 may be a double-sided adhesive tape/paper. The second linear arrangement 220B may be connected to the binding element 218 by the adhesive of the binding element 218. Similar to the first linear arrangement 220A discussed above, the tape/paper extend from one end of the second linear arrangement 220B to another end of the second linear arrangement 220B (e.g., in a same orientation of the cells) and extend to lateral sides of the second linear arrangement 220B (e.g., be as wide as the stacks of the groups). For instance, the tape/paper may be non-conductive to prevent shorts between groups of the first linear arrangement 220A and groups of the second linear arrangement 220B. In some cases, the second linear arrangement 220B may be bound using sheathing (e.g., plastic, foam, paper, Kevlar, and the like), glue (e.g., between and across cells), tape (e.g., around and across groups), or mechanical means (e.g., brackets).

Operation (11) may be optional (e.g., if current/voltage sensing between groups is desired). Operation (11) may include connecting sensing wires 222 to the sensing connectors 216. For instance, the sensing wires 222 may be soldered or welded to the sensing connectors 216. In some cases, the sensing connectors 216 may not be soldered or welded, but instead glued in position near the groups. For instance, a magnetic field sensor (e.g., a hall effect sensor and the like) and/or a temperature sensor may be positioned near a group to sense the current or the temperature without being electrically connected to the group. In these cases, the sensing wires 222 may carry a signal from the magnetic field sensor and/or temperature sensor to, e.g., the control system 125.

Figure 2H:
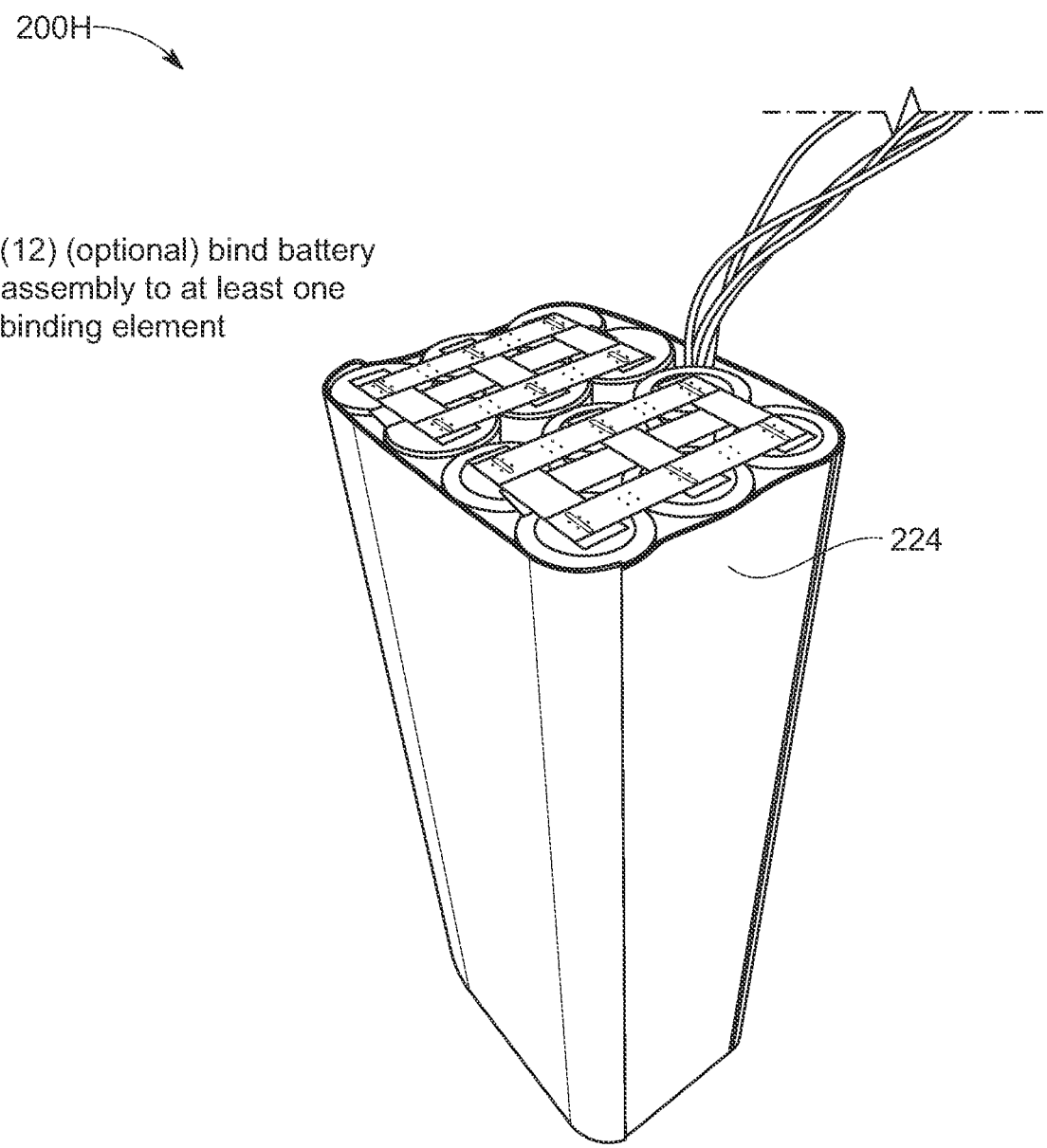

In FIG. 2H, operation (12) may be optional (e.g., to reduce weight, if other binding elements are used on first linear arrangement 220A and second linear arrangement 220B). Operation (12) may include binding the battery assembly 110 to at least one binding element, such as binding element 224. The binding element 224 may be sheathing (e.g., plastic, foam, paper, Kevlar, and the like) around the battery assembly 110, glue (e.g., between and across the battery assembly 110), tape (e.g., around and across the battery assembly 110), or mechanical means (e.g., brackets).

In FIG. 2I, operation (13) may include (before linear arrangement connector 226 is connected to groups) connecting metal grid 226A to runners 226B to form linear arrangement connector 226. For instance, the metal grid 226A may be connected to runners 226B by welding or soldering. In some cases, the runners 226B may be on top of the metal grid 226A (e.g., away from electrodes of groups). In some cases, the runners 226B may be in between the metal grid 226A and electrodes of groups. In some cases, the metal grid 226A may be formed of a first metal, and the runners 226B may be formed of a second metal. The first metal may have a higher electrical resistance than the second electrical resistance. In some cases, the first metal may be nickel and the like. In some cases, the second metal may be copper, and the like.

Figure 2J:
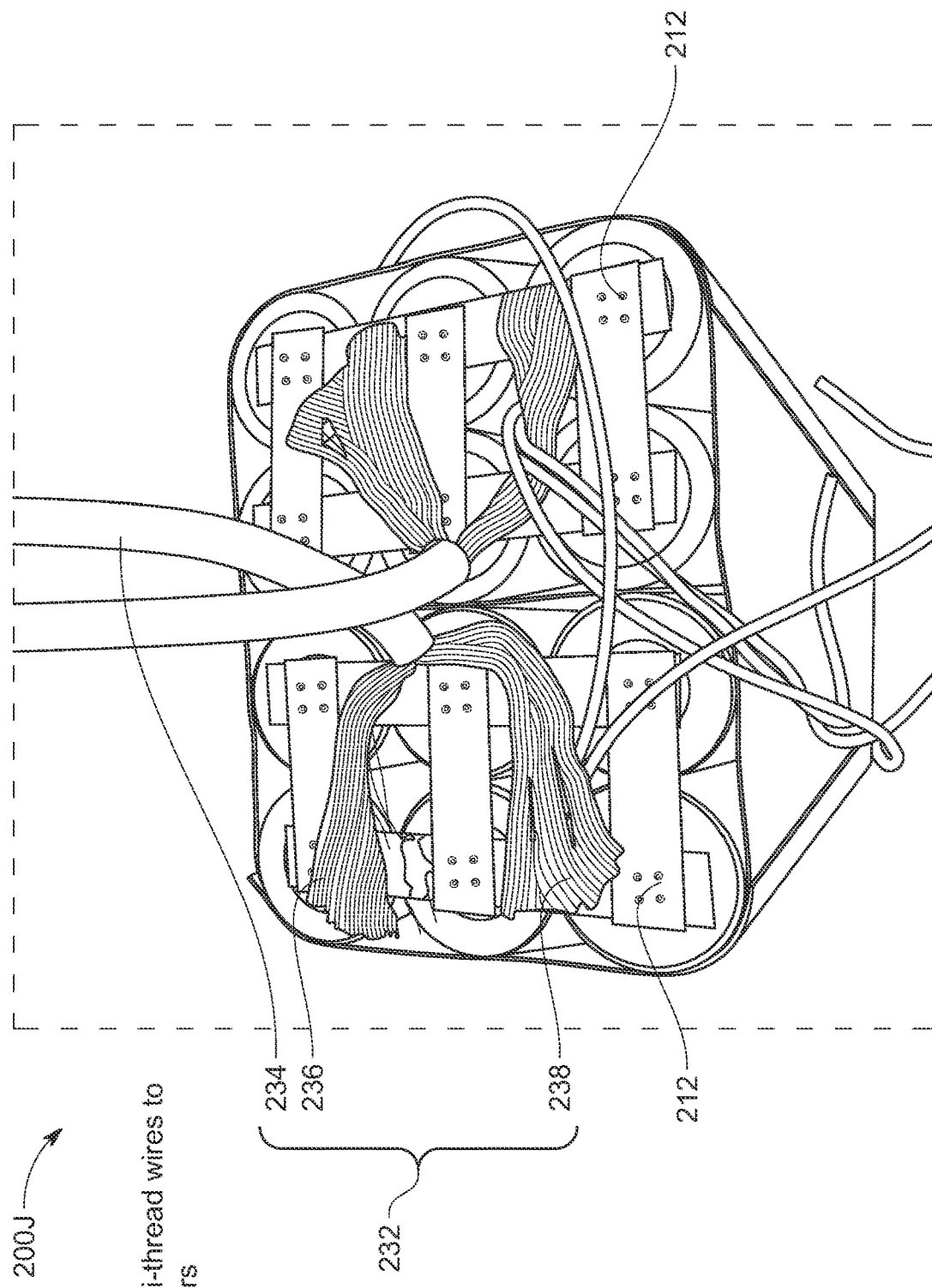

In FIG. 2J, operation (13) may include connecting multi-thread wires 232 to terminal connectors 212. For instance, a first multi-thread wire 232 may be connected to a first terminal connector 212, and a second multi-thread wire 232 may be connected to a second terminal connector 212. In some cases, the multi-thread wires 232 may be connected to the terminal connectors 212 by soldering or welding.

In some cases, the multi-thread wires 232 include a terminal line 234 (as output/input of the battery assembly 110, e.g., connected to the avionics and actuation systems 120, and the control system 125) and the terminal line 234 may be split into at least subthreads 236 and 238. Each of the subthreads may be connected to the terminal connector 212 at different region of the terminal connector 212.

Figure 3A:
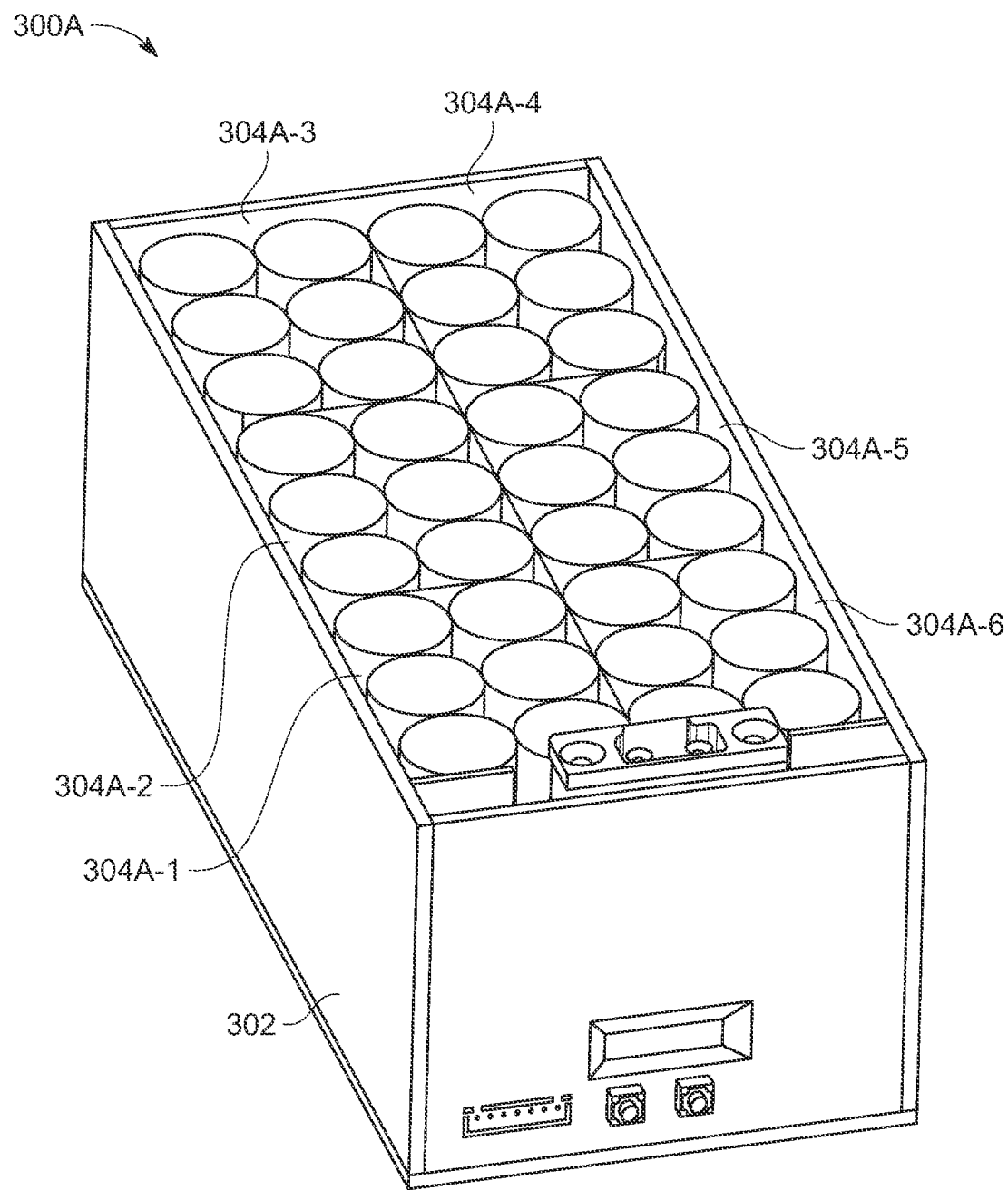
FIGS. 3A-3C depict diagrams of additional features of a battery assembly, in accordance with aspects of the present disclosure.
Figure 3B:
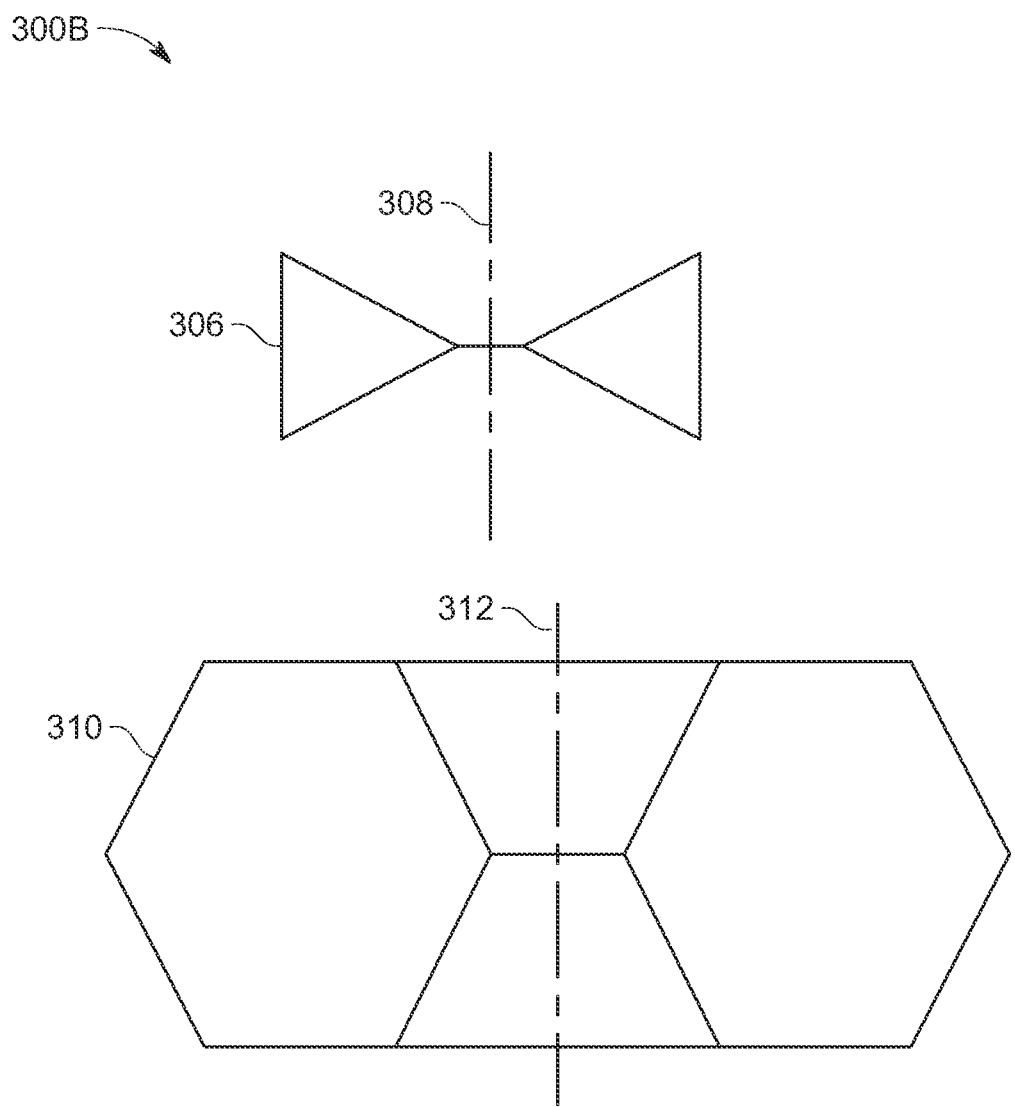
Figure 3C:
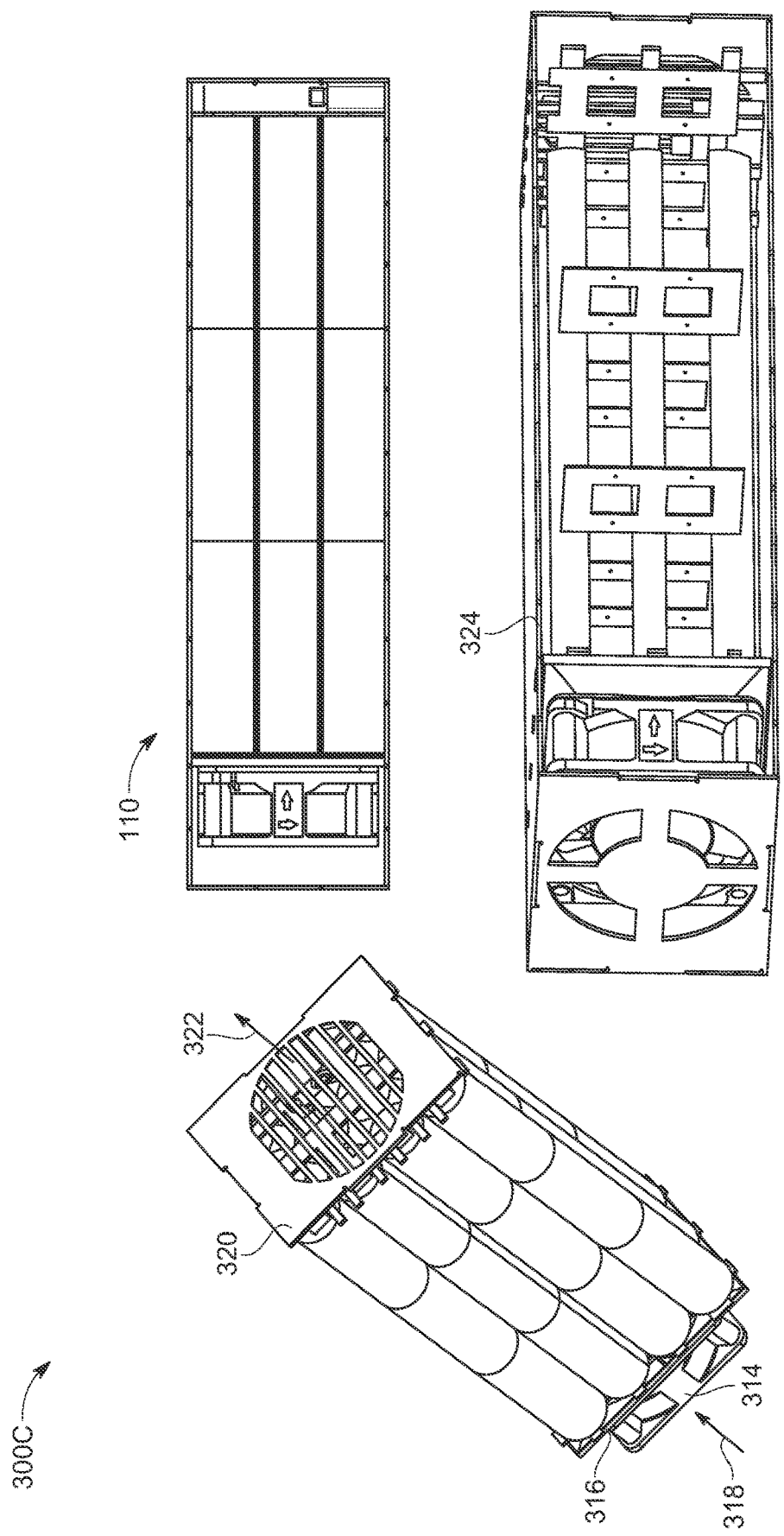

FIGS. 3A-3C depict diagrams 300A-300C of additional features of a battery assembly, in accordance with features of the present disclosure. The diagrams 300A-300C of additional features apply to the battery assembly 110, as described above with respect to FIGS. 1 and 2A-2J.

In diagram 300A, a polycarbonate case 302 for a battery assembly 110 may be depicted. The polycarbonate case 302 may be an example of a binding element 224, as it binds the battery groups 304A-1 through 304A-6 in separate sections of the polycarbonate case 302. The battery groups 304A-1 through 304A-6 may be serially connected via, e.g., a plurality of linear arrangement connectors 226. For instance, a first battery group 304A-1 may be connected to a second battery group 304A-2 by a first linear arrangement connector 226 (not depicted) that would cross on a first side of the battery groups and connect their respective electrodes; the second battery group 304A-2 may be connected to a third battery group 304A-3 by a second linear arrangement connector 226 (not depicted) that would cross on a second side of the battery groups and connect their respective electrodes; the third battery group 304A-3 may be connected to a fourth battery group 304A-4 by a third linear arrangement connector 226 (not depicted) that would cross on the first side of the battery groups and connect their respective electrodes; the fourth battery group 304A-4 may be connected to a fifth battery group 304A-5 by a fourth linear arrangement connector 226 (not depicted) that would cross on the second side of the battery groups and connect their respective electrodes; the fifth battery group 304A-5 may be connected to a sixth battery group 304A-6 by a fifth linear arrangement connector 226 (not depicted) that would cross on the first side of the battery groups and connect their respective electrodes. The first battery group 304A-1 and the sixth battery group 304A-6 may each have a terminal connector 212 (not depicted) connected to second side of the first battery group 304A-1 and the sixth battery group 304A-6. Multi-thread wires 232 (not depicted) may be connected to each of the terminal connectors 212.

In diagram 300B, alternative polygonal arrangements 306 and 310 of the group connectors 208, terminal connectors 212, and the linear arrangement connectors 226 may be depicted. For instance, a first polygonal arrangement 306 may have two triangles of metal grids mirrored over a symmetry line 308 and vertices of the first polygonal arrangement 306 may be where the metal grids are connected to electrodes of battery cells. For instance, a second polygonal arrangement 310 may have two hexagons of metal grids mirrored over a symmetry line 312 and vertices of the second polygonal arrangement 310 may be where the metal grids are connected to electrodes of battery cells. In this manner, the metal grids of the group connectors 208, terminal connectors 212, and the linear arrangement connectors 226 may not be limited to square or rectangular matrix arrangements, but instead may be mirrored-N-sided polygons. In some cases, there may one electrical pathway between respective polygons (see first polygonal arrangement 306). In some cases, there may be multiple electrical pathways between certain vertices of the polygons (second polygonal arrangement 310). The certain vertices of the polygons may be vertices that face the opposite polygon (e.g., those closest to the other polygon without having to traverse other vertices or edges of its own polygon).

In diagram 300C, diagram 300C depicts a battery assembly 110 with a case 324 and fan(s) 314. In particular, diagram 300C depicts circulating air 316 and 322 from fan(s) 314 and diffuser 318 to cool a battery assembly 110. Inflow air 316 may be drawn into fan(s) 314 and passed through diffuser 318 to evenly pass through and around the battery cells of the battery assembly 110. The case 324 may be formed of carbon fiber or Kevlar. As carbon fiber or Kevlar is not highly thermally conductive, the case 324 may have air gaps between battery groups and walls of the case 324, so that air circulating from the fan(s) 314 may pass through and around the battery cells. The diffuser 318 may ensure that inflow air 316 is directed into the battery assembly 110, through and around the battery cells of the battery assembly 110. The diffuser 318 may have different cross-sectional areas that correspond, e.g., the cross-section of the fan(s) 314 and the cross-section of the battery assembly 110. In some cases, the diffuser 318 may be a convergent or a divergent nozzle (to connect the fan(s) 314 to the battery assembly) and efficiently pass the inflow air 316 to the battery assembly 110. After passing through and around the battery cells, the circulated air may exit as outflow air 322 through vent 320. The vent 320 may have at least one opening to exhaust outflow air 322 from the battery assembly 110.

Example Routine(s)

Figure 4:
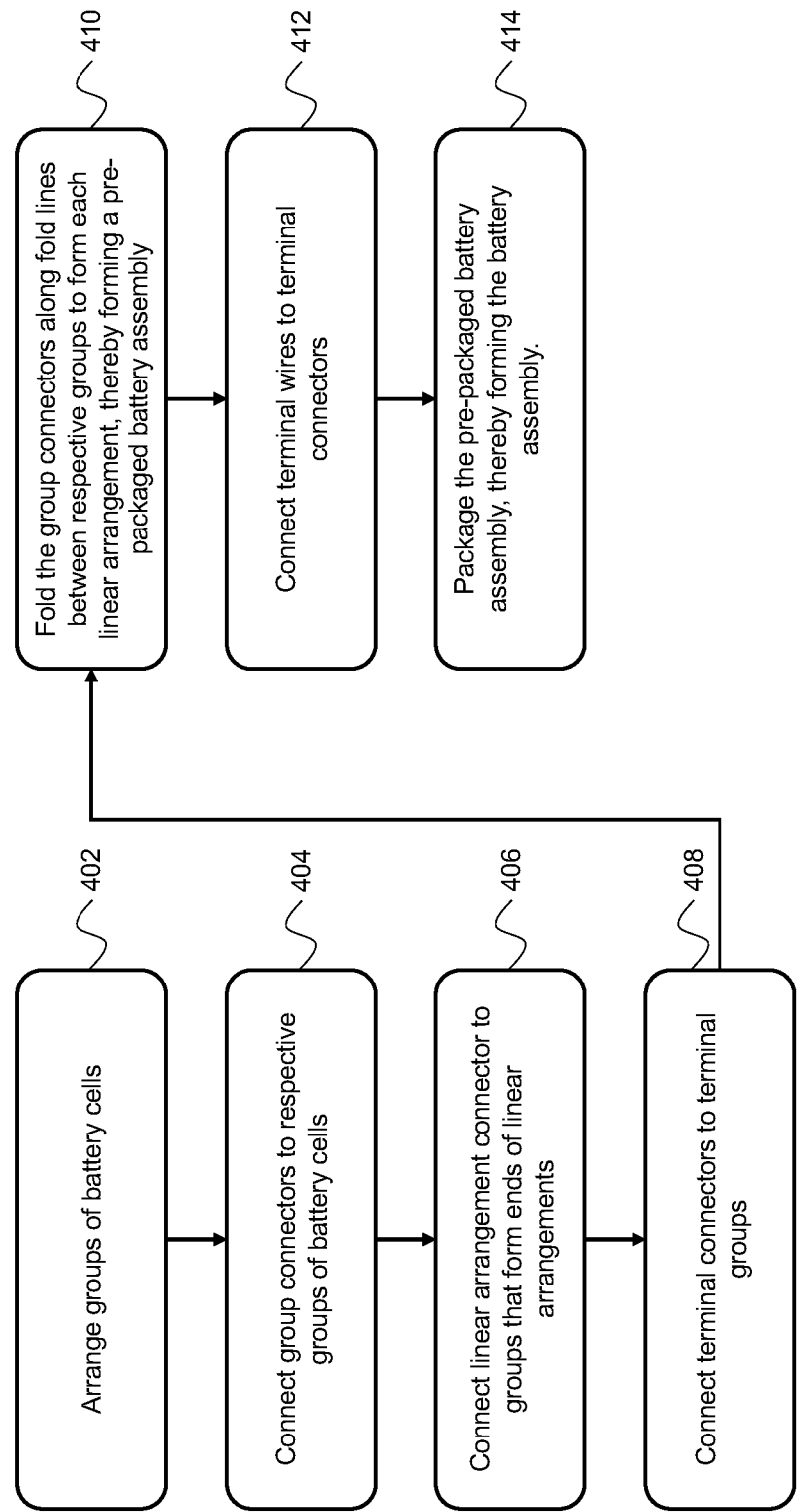
FIG. 4 depicts a flowchart of an exemplary method of manufacturing a battery assembly, in accordance with features of the present disclosure.

FIG. 4 depicts a flowchart of an exemplary routine 400 for manufacturing a battery assembly 110. The routine 400 applies to the battery assembly 110, as described above with respect to FIGS. 1, 2A-2J, and 3A-3C. In the routine 400, the method may be performed by one or more individuals or systems, such as a battery manufacturer.

The routine 400 may start at block 402, where the battery manufacturer may arrange groups of battery cells. At block 404, the battery manufacturer may connect group connectors to respective groups of battery cells. At block 406, the battery manufacturer may connect linear arrangement connector to groups that form ends of linear arrangements. At block 408, the battery manufacturer may connect terminal connectors to terminal groups. At block 410, the battery manufacturer may fold the group connectors along fold lines between respective groups to form each linear arrangement, thereby forming a pre-packaged battery assembly. At block 412, the battery manufacturer may connect terminal wires to terminal connectors. At block 414, the battery manufacturer may package (e.g., bind, wrap, and the like) the pre-packaged battery assembly, thereby forming the battery assembly.

Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

Examples

Clause 1. A battery assembly, the battery assembly comprising: a first battery assembly terminal; a second battery assembly terminal; a plurality of battery cells, wherein the plurality of battery cells are arranged in groups, wherein each group of battery cells has a stacked arrangement of n by m battery cells orientated in a same direction, wherein n is at least two and m is at least two; a first subset of the groups of battery cells form a first linear arrangement connected to the first battery assembly terminal and the first subset are arranged end-to-end in a first direction; and a second subset of the groups of battery cells form a second linear arrangement connected to the second battery assembly terminal and the second subset are arranged end-to-end in a second direction; a plurality of group connectors, each group connector being configured to connect two respective battery cell groups within each of the first linear arrangement or the second linear arrangement, wherein each group connector connects cathodes of a first battery cell group to anodes of a second battery cell group; and a linear arrangement connector configured to connect the first linear arrangement to the second linear arrangement.

Clause 2. The battery assembly of Clause 1, further comprising: a first binding element to bind the first linear arrangement and the second linear arrangement, and a second binding element to bind battery cells of a group together.

Clause 3. The battery assembly of any of Clauses 1-2, wherein the first direction is parallel and opposite the second direction.

Clause 4. The battery assembly of any of Clauses 1-3, wherein the group connectors are made of metal.

Clause 5. The battery assembly of any of Clauses 1-4, wherein the group connectors are a metal grid having a grid pattern of [2n by m] or [n by 2m] folded over an n axis or m axis.

Clause 6. The battery assembly of any of Clauses 1-5, wherein the group connectors are a metal grid having a grid pattern, and the group connectors fold over a symmetry line of the grid pattern.

Clause 7. The battery assembly of any of Clauses 1-6, wherein the linear arrangement connector is a metal grid welded to battery cells of different groups.

Clause 8. The battery assembly of any of Clauses 1-7, wherein the linear arrangement connector is a metal grid of a first metal welded to battery cells of different groups with runners of a second metal welded to metal grid, wherein the first metal has a higher electrical resistance than the second metal to reduce electrical resistance between the different groups.

Clause 9. The battery assembly of any of Clauses 1-8, wherein the first battery assembly terminal is a metal grid welded to battery cell terminals of a terminal group of battery cells.

Clause 10. The battery assembly of any of Clauses 1-9, wherein the first battery assembly terminal is a metal grid welded to battery cell terminals of a terminal group of battery cells, and the first battery assembly terminal has a multi-thread wire connected to the metal grid.

Clause 11. The battery assembly of any of Clauses 1-10, wherein the first battery assembly terminal is a metal grid welded to battery cell terminals of a terminal group of battery cells, the first battery assembly terminal has a multi-thread wire connected to the metal grid, and the multi-thread wire is split into at least two subthreads and connected to separate regions of the metal grid.

Clause 12. The battery assembly of any of Clauses 1-11, wherein the first battery assembly terminal is a metal grid welded to battery cell terminals of a terminal group of battery cells, the first battery assembly terminal has a multi-thread wire connected to the metal grid, the multi-thread wire is split into at least two subthreads and connected to separate regions of the metal grid, and the at least two subthreads are a same number as largest of n or m.

Clause 13. The battery assembly of any of Clauses 1-12, wherein the first linear arrangement and the second linear arrangement are two of a plurality of linear arrangements.

Clause 14. The battery assembly of any of Clauses 1-13, wherein the first linear arrangement and the second linear arrangement have a same or different number of groups.

Clause 15. The battery assembly of any of Clauses 1-14, wherein each group has a same or different number of battery cells.

Clause 16. The battery assembly of any of Clauses 1-15, wherein the group connectors are a metal polygon grid with an axis of symmetry, wherein the group connectors are folded along the axis of symmetry such that connected groups are arranged end-to-end.

Clause 17. The battery assembly of any of Clauses 1-16, further comprising a fan positioned at one end of the battery assembly and configured to circulate air through the battery assembly.

Clause 18. The battery assembly of any of Clauses 1-17, further comprising a fan for each linear arrangement configured to circulate air through each linear arrangement.

Clause 19. An aerospace vehicle, comprising: a battery assembly as claimed in any of claims 1-18; a housing configured to receive the battery assembly; avionics and actuation systems positioned on the housing and configured to control speed, altitude, orientation, and/or attitude of the aerospace vehicle via power from the battery assembly; and a control system to control the avionics and actuation systems.

Clause 20. A method of manufacturing a battery assembly: arrange groups of battery cells; connect group connectors to respective groups of battery cells; connect linear arrangement connector to groups that form ends of linear arrangements; connect terminal connectors to terminal groups; fold the group connectors along fold lines between respective groups to form each linear arrangement, thereby forming a pre-packaged battery assembly; connect terminal wires to terminal connectors; and package the pre-packaged battery assembly, thereby forming the battery assembly.

What is claimed is:

1. A battery assembly, the battery assembly comprising:
   a first battery assembly terminal;
   a second battery assembly terminal;
   a plurality of battery cells, wherein the plurality of battery cells are arranged in groups, wherein
      each group of battery cells has a stacked arrangement of n by m battery cells orientated in a same direction corresponding to an electrode placement of each battery cell of the n by m battery cells, wherein n is at least two and m is at least two;
      a first subset of the groups of battery cells form a first linear arrangement of the groups, wherein at least one group of the first subset of groups is connected to the first battery assembly terminal, and wherein the first subset of the groups are arranged end-to-end in a first direction common to each group of the first subset; and
      a second subset of the groups of battery cells form a second linear arrangement of the groups, wherein at least one group of the second subset of groups is connected to the second battery assembly terminal, wherein the second subset of the groups of the second subset are arranged end-to-end in a second direction, and wherein the second direction is different than the first direction;
   a plurality of group connectors, each group connector being configured to connect two respective battery cell groups within each of the first linear arrangement or the second linear arrangement, wherein each group connector connects cathodes of a first battery cell group to anodes of a second battery cell group; and
   a linear arrangement connector configured to connect the first linear arrangement to the second linear arrangement.

2. The battery assembly of claim 1, further comprising:
   a first binding element to bind the first linear arrangement and the second linear arrangement, and
   a second binding element to bind battery cells of a group together.

3. The battery assembly of claim 1, wherein the first direction is parallel and opposite the second direction.

4. The battery assembly of claim 1, wherein the group connectors are made of metal.

5. The battery assembly of claim 1, wherein the group connectors are a metal grid having a grid pattern of [2n by m] or [n by 2m] folded over an n axis or m axis.

6. The battery assembly of claim 1, wherein the group connectors are a metal grid having a grid pattern, and the group connectors fold over a symmetry line of the grid pattern.

7. The battery assembly of claim 1, wherein the linear arrangement connector is a metal grid welded to battery cells of different groups.

8. The battery assembly of claim 1, wherein the linear arrangement connector is a metal grid of a first metal welded to battery cells of different groups with runners of a second metal welded to metal grid, wherein the first metal has a higher electrical resistance than the second metal to reduce electrical resistance between the different groups.

9. The battery assembly of claim 1, wherein the first battery assembly terminal is a metal grid welded to battery cell terminals of a terminal group of battery cells.

10. The battery assembly of claim 1, wherein the first battery assembly terminal is a metal grid welded to battery cell terminals of a terminal group of battery cells, and the first battery assembly terminal has a multi-thread wire connected to the metal grid.

11. The battery assembly of claim 1, wherein the first battery assembly terminal is a metal grid welded to battery cell terminals of a terminal group of battery cells,
   the first battery assembly terminal has a multi-thread wire connected to the metal grid, and
   the multi-thread wire is split into at least two subthreads and connected to separate regions of the metal grid.

12. The battery assembly of claim 1, wherein the first battery assembly terminal is a metal grid welded to battery cell terminals of a terminal group of battery cells,
   the first battery assembly terminal has a multi-thread wire connected to the metal grid,
   the multi-thread wire is split into at least two subthreads and connected to separate regions of the metal grid, and
   the at least two subthreads are a same number as largest of n or m.

13. The battery assembly of claim 1, wherein the first linear arrangement and the second linear arrangement are two of a plurality of linear arrangements.

14. The battery assembly of claim 1, wherein the first linear arrangement and the second linear arrangement have a same or different number of groups.

15. The battery assembly of claim 1, wherein each group has a same or different number of battery cells.

16. The battery assembly of claim 1, wherein the group connectors are a metal polygon grid with an axis of symmetry, wherein the group connectors are folded along the axis of symmetry such that connected groups are arranged end-to-end.

17. The battery assembly of claim 1, further comprising a fan positioned at one end of the battery assembly and configured to circulate air through the battery assembly.

18. The battery assembly of claim 1, further comprising a fan for each linear arrangement configured to circulate air through each linear arrangement.

19. An aerospace vehicle, comprising:
- a battery assembly as claimed in claim 1;
- a housing configured to receive the battery assembly;
- avionics and actuation systems positioned on the housing and configured to control speed, altitude, orientation, and/or attitude of the aerospace vehicle via power from the battery assembly; and
- a control system to control the avionics and actuation systems.

20. A method of manufacturing a battery assembly:
- arrange groups of battery cells;
- connect group connectors to respective groups of battery cells;
- connect linear arrangement connector to groups that form ends of linear arrangements;
- connect terminal connectors to terminal groups;
- fold the group connectors along fold lines between respective groups to form each linear arrangement, thereby forming a pre-packaged battery assembly;
- connect terminal wires to terminal connectors; and
package the pre-packaged battery assembly, thereby forming the battery assembly.

* * * * *